July 25, 1967  A. H. ROSENTHAL  3,332,314
OPTICAL INTERFEROMETRIC NAVIGATIONAL INSTRUMENT
Filed April 8, 1963  3 Sheets-Sheet 1
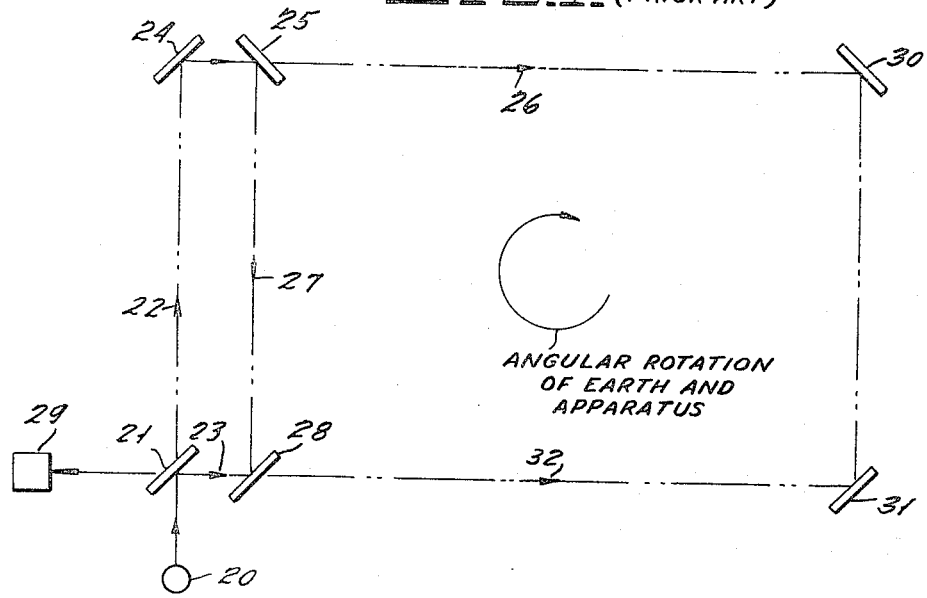
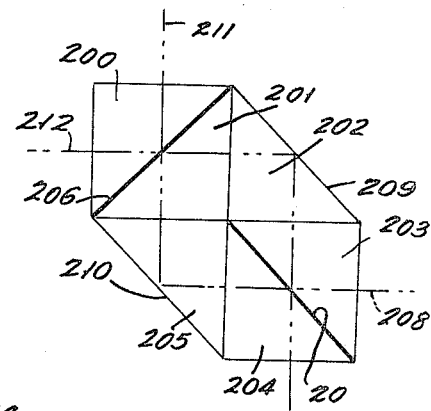
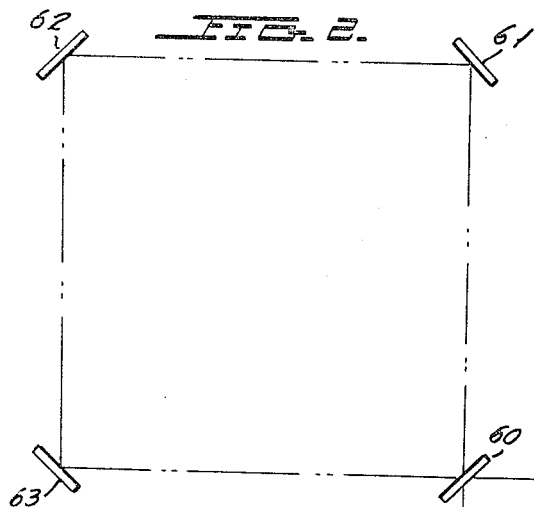
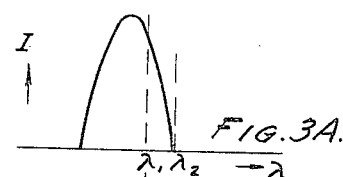
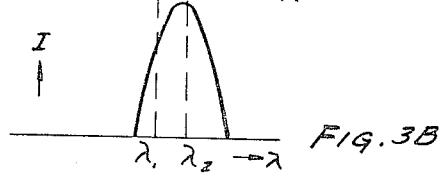
INVENTOR.
ADOLPH H. ROSENTHAL, DECEASED
BY LILLY S. ROSENTHAL, EXECUTRIX
BY
OSTROLENK, FABER, GERB & SOFFEN
ATTORNEYS INVENTOR.
ADOLPH H. ROSENTHAL, DECEASED
By LILLY S. ROSENTHAL, EXECUTRIX
BY
OSTROLENK, FABER, GERB & SOFFEN
ATTORNEYS

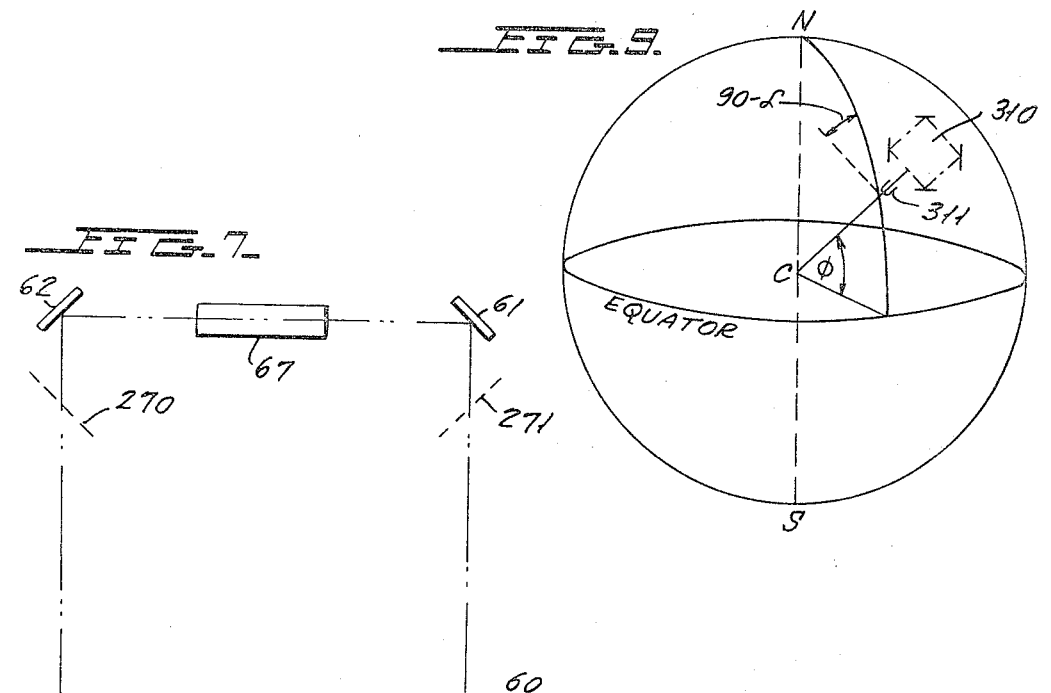
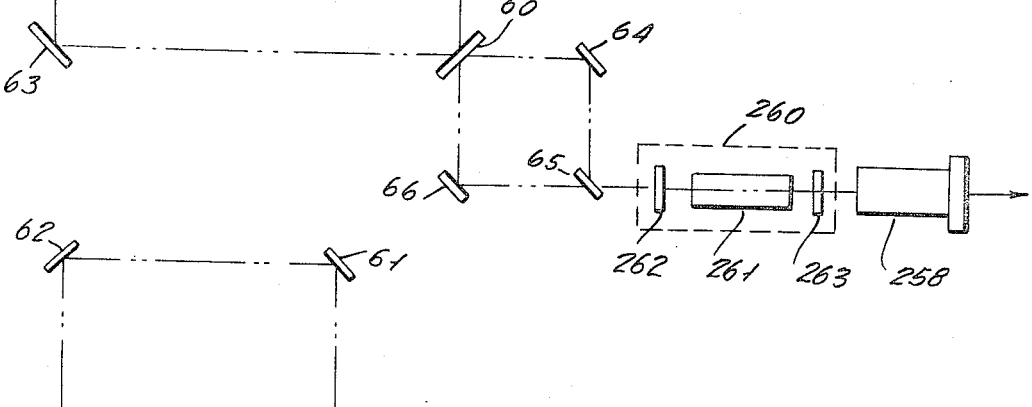
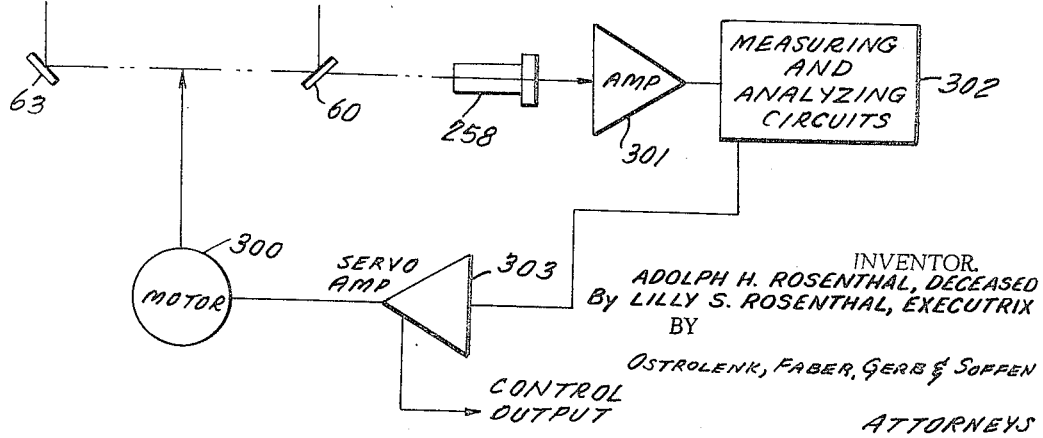

United States Patent Office 3,332,314
Patented July 25, 1967

3,332,314
OPTICAL INTERFEROMETRIC NAVIGATIONAL
INSTRUMENT
Adolph H. Rosenthal, deceased, late of Forest Hills, N.Y.,
by Lilly S. Rosenthal, executrix, Forest Hills, N.Y., assignor to Kollsman Instrument Corporation, Elmhurst,
N.Y., a corporation of New York
Filed Apr. 8, 1963, Ser. No. 271,521
2 Claims. (Cl. 88—14)

My invention relates to directional reference systems, and more specifically relates to a directional reference system which is comprised of the combination of a radiation source of high spectral coherence or monochomaticity and a high resolution interferometric system whereby the radiation of the radiation source is split into two beams which travel around a closed circuit, and are brought to interference to deliver directional information to the user of the device.

Generally, and as a first embodiment of the invention, when the platform or structure supporting the interferometer, radiation source and radiation detector are in angular motion, the optical paths of the two beams travelling around the closed circuit are different, depending upon the angular motion of the platform and the paths of the beams. This will cause a shift in the fringe pattern developed in a high resolution inteferometer, whereby information as to the motion of the platform may be derived.

As a second embodiment of the invention, and by using a radiation source of high spectral coherence as part of the interferometer circuit, the two beams of light travelling in opposite directions around a closed optical circuit will be of different frequencies, depending upon the angular motion of the system so that, again, directional information can be obtained.

To make a useful directional reference instrument using this concept, it is necessary that the radiation source be of high spectral coherence or monochromaticity, and that the interferometer be one of highest resolution. This is to be contrasted to equipment used in early experiments, the purpose of which was to establish the rotary motion of the earth through the hypothetical ether, and which were related to the theories of relativity.

However, the early experimenters could not reduce their experimental equipment to practical navigational instruments, since they did not recognize the critical importance of a highly coherent source of radiation or a high resolution interferometer. I have, however, found these parameters to be of critical importance in reducing the size of the equpiment to an order which is practical for application in directional reference, control navigation, and guidance systems.

Moreover, I have discovered novel interferometric configurations per se which are ideally applicable to the present invention for achieving the high resolution required.

Structures which can be appropriately used in accordance with the invention and to achieve the high spectral coherence required can be found, for example, in optical masers where stimulated emission from an active medium in which the transition levels have a negative temperature population distribution is utilized. By high spectral purity coherence, I mean high monochromaticity or spectral or small relative line width. Similarly, other radiation sources of high coherence such as those using the recoil-free gamma ray resonance effect, i.e. the so-called Mössbauer effect, can be used.

Accordingly, a primary object of this invention is to provide a novel combination of a radiation source of high spectral coherence and a novel type of interferometer for a directional reference instrument.

Another object of this invention is to provide a novel directional reference system or guidance instrument in which a beam of radiation of high spectral coherence is split into two beams and the two beams travelling around a closed path are brought to interference with one another, and the fringe shift is observed to deliver directional information.

Another object of this invention is to provide a novel directional reference instrument which does not require movable parts as in a gyroscope.

A further object of this invention is to provide a novel measuring instrument which utilizes the combined properties of a radiation source of high spectral coherence and a novel high resolution interferometer.

Another object of this invention is to provide a novel combination of radiation source and interferometer where the radiation from the source makes multiple traverses around the interferometer.

A further object of this invention is to measure angular velocity by causing radiation from a radiation source of high spectral coherence to travel in two directions around a closed path which includes a component of the angular velocity to be measured, whereby the fringe shift is a measure of the angular velocity.

Another object of the invention is to provide a novel directional reference instrument wherein an optical maser is used as an integral element in a novel type of high resolution interferometer to generate two beams of different frequencies when the assembly is rotated, and whereby these two beams of different frequencies can be combined at a phototransducer to produce a beat frequency output which is a measure for the rate of directional change.

Another object of the invention is to provide novel interferometer structures.

These and other objects of my invention will become apparent from the following description when taken in connection with the drawings, in which:

FIGURE 1 schematically illustrates the experimental system used in the Michelson-Gale experiment.

FIGURE 2 shows a first embodiment of the invention.

FIGURES 3a and 3b illustrate the manner in which the split-field measuring technique can be used in FIGURE 2.

FIGURE 4 illustrates the manner in which the mirror system of FIGURE 2 can be formed by a plurality of prisms cemented together in a single rigid body.

FIGURE 7 illustrates a further embodiment of the invention.

FIGURE 8 illustrates the manner in which the output signals of the invention can be used to drive measuring and analyzing circuits.

FIGURE 9 illustrates the manner in which the invention can be applied as a terrestrial compass.

Figure 5:
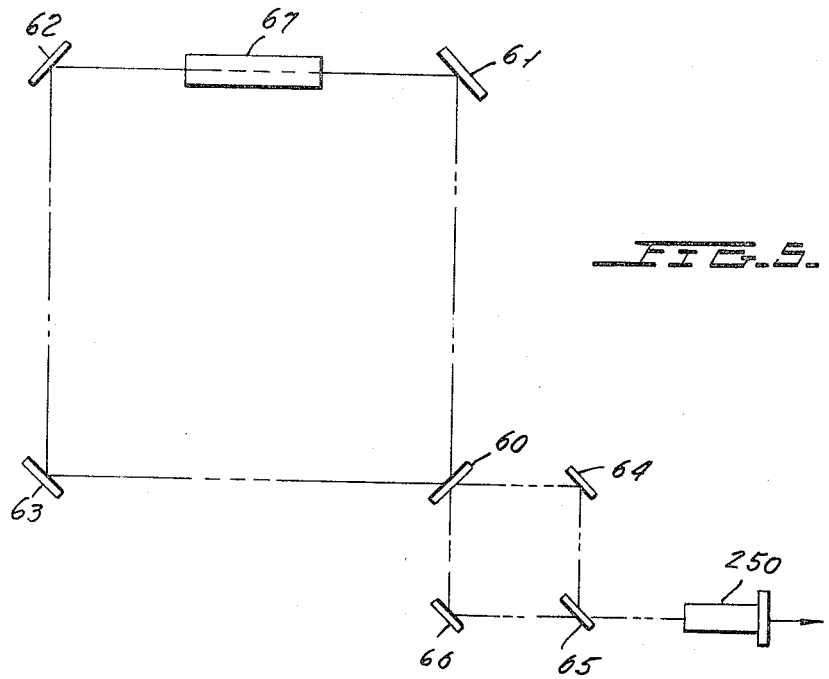
FIGURE 5 illustrates a second embodiment of the invention.

For an understanding of the invention, it is useful to understand the history of the theories which were used until the development of the novel structures of the invention which recognizes the importance of radiation sources of high spectral coherence in combination with novel high resolution interferometer configurations.

As early as 1904, A. A. Michelson suggested an experiment to detect the rotation of the earth (A. A. Michelson Phil. Mag. (6) 8, 716 (1904)). Michelson proposed to cause two light beams to travel around a closed horizontal circuit on the surface of the earth. This closed horizontal surface would contain a component of the angular velocity of the earth's rotation, the magnitude of this component depending upon the latitude of the equipment.

One beam travels in the direction of the earth's rotation, while the other beam travels opposite to the direction of the earth's rotation, the two beams defining a closed circuit. After traversing the circuit, the two beams are then brought to interference and fringe positions are observed.

The purpose of this experiment was to test the hypothesis of a fixed ether which would predict a phase shift between the two beams which would be proportional to the angular velocity components and area of the circuit. Since the angular rotational velocity of the earth is very low (7.27 times $10^{-5}$ radians per second), a circuit of the order of a mile in length would be required to obtain a detectable fractional fringe shift.

Following Michelson's lead, G. Sagnac recognized that he could avoid the experimental difficulties required in such a large circuit for measuring angular rotation of the earth by using a laboratory turntable having a relatively high angular velocity for mounting the light source and interferometric equipment. Sagnac's work which was published in 1914 in J. Phys. Radium (5) 4,177 (1914) reports the use of a laboratory turntable having a 50 centimeter diameter which mounts the interferometer and which is rotated at an angular speed of 2 revolutions per second. With this equipment, he found that he could measure fringe displacements which were within the theoretical prediction and, therefore, demonstrated that an experiment corresponding to that proposed by Michelson could be carried out.

In 1925 Michelson, in cooperation with H. G. Gale carried out the originally proposed experiment using the earth as a rotating platform and an optical circuit enclosed in an evacuated pipe system which formed a rectangle of 1,113 feet by 2,010 feet.

With this equipment, they found a fringe displacement which was, again, in accordance with theoretical prediction, as reported by A. A. Michelson and H. G. Gale in Nature 115, 566 (1925); Astrophysical J. 61, 137 and 140 (1925). It might be noted that the positive results of the Michelson and Gale experiment and of the Sagnac experiment were in full accord with the theory of relativity and, in conjunction with the negative result of the well-known Michelson-Morley experiment, confirmed the theory of relativity, whereas these different results would contradict one another on the basis of a material ether.

The Michelson-Gale experiment is schematically shown in FIGURE 1. Two optical paths are provided in FIGURE 1; a first small one for calibration, and a second and large path for measurement. The calibration path includes mirrors 21, 24, 25 and 28. A light source 20 directs a beam of light at mirror 21 which is a half-silvered mirror and acts as a beam splitter producing a first light beam 22 and a second light beam 23. Light beam 22 is directed at a totally reflecting mirror 24 which reflects beam 22 toward a beam splitting mirror 25 which splits beam 22 into two beams 26 and 27. The light of beam 27 is directed toward beam splitting mirror 28 which directs beam 27 to the left in a direction opposite to that of beam 23 and toward a light observing means 29.

In a similar manner, a portion of the light beam 23 is reflected upwardly by mirror 28 and toward mirror 25 and thence toward mirror 24 back to mirror 21, and then toward observing means 29. Thus, two beams of light travel around the first small circuit including mirrors 21, 24, 25 and 28 in opposite directions, and are brought to interference at the mirror 21.

The main circuit includes beam splitting mirror 21, plus the totally reflecting mirrors 24, 30 and 31. Thus, light beam 26 travels in a clockwise direction toward mirror 30 and thence to mirror 31 and back through mirrors 28 and 21 to observing means 29. In the same manner, the light beam 32 which is the portion of beam 23 which passes through mirror 28 goes around the circuit in a counterclockwise direction to mirrors 31, 30, 24 until reflected by mirror 21 toward observing means 29.

By mounting this system horizontally, the system will include a component of the angular rotation of the earth depending upon the latitude, as indicated by the circular arrow. Thus, one of the beams rotates in the direction of this angular velocity component, while the other of the beams rotates in a direction opposite to the component of angular velocity of the earth. Accordingly, portions of the beams which are simultaneously generated at source 20 reach observing means 29 at different times, since they must travel different path lengths in view of the angular rotation of the system. That is, mirror 21 moves away from the beam travelling in the direction of the angular velocity component while mirror 21 moves toward the beam travelling in a direction opposite from the direction of angular velocity. Thus, the two beams combine in mirror 21 after travelling a different length of time. Therefore, the fringes observed by the interference of the beams travelling the larger circuit will be shifted from the pattern observed by the interference of beams in the smaller reference circuit in proportion to the angular velocity of the system.

The actual fringe displacement obtained as a function of the angular velocity of the system of FIGURE 1 can be derived simply by considering the optical circuit as defining a circle having a radius $r$ which rotates about the center of the circle with an angular velocity $\omega$. It can be demonstrated that the selection of a circular path does not affect the result of the derivation, and the results apply to any shape of the circuit including the rectangular system of FIGURE 1.

When the system is viewed from an inertial system and also regardless of whether the center of rotation is inside or outside of the circuit relative to which the optical circuit rotates, the point at which the two beams are to unite, such as mirror 21, will advance with respect to the beam moving in the direction of rotation by a path differential of $\Delta p_1 = \omega r t$ in the time $$t = \frac{2\pi r}{c}$$

which is the time taken for the beam to travel around the full circuit where $c$ is the velocity of the light. Therefore, $\Delta p_1 = 2\pi \omega r^2/c = 2\omega S/c$, where $S = \pi r^2$, and is the surface area enclosed by the circuit. The same relationship holds true for the other beam, but in an opposite sense so that the total path differential between the two beams is $$\Delta p = \frac{4\omega S}{c}$$

Therefore, a fringe displacement measured in terms of the wave-length $\lambda$ of the radiation used will be $$\Delta n = \frac{\Delta p}{\lambda} = \frac{4\omega S}{c\lambda} \quad (1)$$

In this latter equation, it is, therefore, seen that the fringe displacement measured is proportional to the angular velocity of the system and to the surface area of the system, and is inversely proportional to the wavelength of the light used.

It can be shown that this result is generally applicable to any irregularly shaped optical circuit which encloses an area $S$ which two light beams traverse in opposite directions and regardless of whether or not the center of rotation is inside or outside of this circuit. Moreover, the result can be shown to hold generally even for non-plane circuits through the application of Stoke's theorem.

Moreover, this result is obtainable from calculations based on the theory of relativity, since in any first order effect of $V/c$, the Lorentz contraction can be neglected as can any direct influence of rotational acceleration or gravity.

As viewed from within the rotating system, the light beam will be slightly curved toward the right in the northern hemisphere, and toward the left in the southern hemisphere, but this curvature can be neglected in its effect on the fringe displacement.

It remains to consider the effect of latitude on the fringe displacement. Assuming an arbitrary direction of the axis of rotation of the optical circuit, the surface area S of the above equations represents the projection of the actual surface area of the circuit upon a plane perpendicular to the axis of rotation. Thus, for a plane circuit, S is the actual loop area times the cosine of the angle between a normal to the plane of the circuit and the axis of rotation. Therefore, in the case of a terrestrial horizontal plane optical circuit of area S, which is at a latitude $\phi$, the relationship for fringe displacement given in Equation 1 above must be changed to $$\Delta n = \frac{4\omega S \sin \phi}{c\lambda} \quad (2)$$

Conversely, where a vertical plane optical circuit of area S is oriented with its normal in the North-South direction, the fringe displacement at the latitude $\phi$ becomes $$\Delta n = \frac{4\omega S \cos \phi}{c\lambda} \quad (3)$$

Finally, where such a vertical circuit is mounted rotatably about a vertical axis, and its normal forms an angle $\alpha$ with the North-South direction, the fringe displacement at latitude $\phi$ obviously becomes $$\Delta n = \frac{4\omega S \cos \phi \cos \alpha}{c\lambda} \quad (4)$$

This arrangement can, therefore, be used as a terrestrial compass and represents one type of navigational directional reference system of the type to which the invention is directed.

In the above type system, the value of the fringe displacement could be increased by a factor $l$ by sending the light beams around the circuit $l$ times before they are brought to interference. This, in effect, increases the surface area S whereby a smaller device can serve the function of the large area circuit in which the beams circulate only a single time.

With the structure of FIGURE 1, it is apparent that causing multiple circulation of the beam is impractical because of the beam splitting mirrors 21, 25 and 28 and, as will be seen more fully hereinafter, novel optical circuits have been devised to permit such multicirculation.

However, even when multiple circulation is used by itself, it is still not possible to reduce the equipment proposed by Michelson to a sufficiently small size to make it practical for navigational use.

One of the most serious drawbacks with the Michelson and Sagnac equipment as well as the equipment later developed as by Sagnac and Pogany (B. Pogany Ann. Physik (4), 80, 217 (1926)) is that the fringe shift to be measured is exceedingly small even when relatively large angular velocities are used. For example, for terrestrial applications where the angular velocity of the earth is $7.27 \times 10^{-5}$ radians per second, and a reasonably small circuit area is to be used, the phase shifts of the interfering light beams will be quite small. Thus, with a square vertcial optical circuit of 5 feet by 5 feet at a latitude of 40°, and using a light of 5,000 angstroms in wavelength, the fractional fringe shift would be about $3 \times 10^{-6}$. With the two-beam interferometer of the type shown in FIGURE 1 such small phase shift could not be measured. It is this factor which has prevented the theories set forth above and used for scientific purposes from being used in practical navigational directional reference equipment.

I have recognized that by using the principles of high resolution interferometry, in combination with radiation sources having a high degree of spectral coherence, or monochromaticity, that practical navigational directional reference equipment can be realized.

In a two-beam interferometer using a monochromatic light source, the intensity of the fringes has a $\cos^2 \theta$ shape, where $\theta$ is the direction in which the intensity is measured. This makes the half-intensity width of the fringes, sometimes called the instrument or apparatus half-width $W_{1/2}$ equal to one-half of the fringe spacing. However, where a high resolution interferometer is used, the fringe character is changed from the broad $\cos^2 \theta$ shape to one having very sharp lines whose width is only a small fraction of their distance apart. Moreover, and so that the greatly reduced instrument width can be useful, the line width of the radiation source must be even smaller, so that, as will be shown more fully hereinafter, even with instruments of the highest spectral resolving powers, radiation sources having an exceedingly high degree of monochromaticity are required.

A suitable source of radiation could be provided by presently available optical masers and recoil-free gamma ray resonance devices based on the Mössbauer effect.

The present invention contemplates the novel combination of such radiation sources of highest spectral coherence with novel interferometer configurations of highest resolving power whereby practical directional reference equipment can be constructed using some of the concepts presented by Michelson and recognizing for the first time the requirement of such high spectral coherence and high interferometric resolution.

Furthermore, in the noval combination, the optical circuit is isolated from the beam splitter means to permit multiple beam formation and multiple transverses of the optical circuit which plays an important part in providing a useful instrument having practical size.

Furthermore, in one important class of instruments according to the present invention, the light source of high spectral coherence forms an integral part of a novel interferometer circuit, making this circuit regenerative and obtaining thereby resolutions of a degree which were unobtainable heretofore.

Before considering the novel structure, however, it is important to show the relationships between the spectral coherence of a source and the resolution of the interferometer used. It is through these considerations that I have discovered the requirement of sources of high spectral coherence, high resolution of novel interferometer means, and isolation of the main optical circuit and the beam splitters when some of the concepts of Michelson are to be applied to practical (navigational) directional reference instrumentation.

Interference fringes from a multiplicity of interfering beams become increasingly sharp as the number of interfering beams increases and the width of the fringes formed by the interfering light beams becomes then very narrow with relation to the spacing of the fringes, and as compared to the normal broad $\cos^2 \theta$ fringes resulting from the interference of only two beams. For example, the Fabry-Perot interferometer utilizes multiple beam interference, and gives such high resolution measurement. Similarly, the interferometer of Lummer and Gehrke as well as ordinary diffraction gratings are based on multiple beam interference and, therefore, can achieve this result.

Considering, for purposes of illustration, the Fabry-Perot type of device using parallel spaced mirrors, the intensity distribution of the fringe system as a function of the phase difference $\delta$ of successive beams can be expressed as:

$$I = \frac{T^2}{(1-R)^2} \times \frac{1}{1 + \{4R/(1-R)^2\} \sin^2 \frac{\delta}{2}} \quad (5)$$

Where $$\delta = \frac{2\pi}{\lambda} \times 2\eta t \cos \theta$$

$T$ = transmission coefficient of the mirrors,
$R$ = the reflection coefficient of the mirrors,
$t$ = the distance between the mirrors,
$\eta$ = the index of refraction of the medium enclosed between the mirrors.

$\theta$ is the angle from the central optical axis at which the intensity is determined. The fringe maxima occur for $$\sin^2 \frac{\delta}{2} = 0$$

and have an intensity of $$I = \frac{T^2}{(1-R)^2} \quad (6)$$

The angular position $\theta$ of these fringe maxima is determined by $$2\eta \cos \theta = n\lambda$$

Where $n$ is the fringe order or path difference between successive beams measured in wavelengths.

As the reflection coefficient R increases, the sharpness of the fringes increase, and their half-intensity width $M_{1/2}$ is in close approximation to $$W_{1/2} = \frac{1-R}{\pi\sqrt{R}} \quad (8)$$

The resolving power of the instrument has been defined for diffraction gratings as $$s = \frac{\lambda}{\Delta\lambda_I} = nN_e \quad (9)$$

Where $\Delta\lambda_I$ is the instrument width or the minimum resolvable wavelength difference, and $N_e$ is the effective number of interfering beams corresponding, for example, to the number of lines of a diffraction grating.

From the Rayleigh criterion follows:

$$N_e = \frac{2.98\sqrt{R}}{1-R} \quad (10)$$

so that $$N_e = \frac{0.933}{W_{1/2}} \quad (11)$$

The following table illustrates some values of $W_{1/2}$ and $N_e$ for six typical reflecting powers R:

TABLE I

| R (percent) | $W_{1/2}$ | $N_e$ |
|---|---|---|
| 50 | 0.2251 | 4.1 |
| 90 | 0.0336 | 27.8 |
| 95 | 0.0163 | 57.1 |
| 97 | 0.0097 | 96.2 |
| 98 | 0.0064 | 145.1 |
| 99 | 0.0032 | 291.7 |
| 99.5 | 0.0016 | 584.6 |

From the above table, it is clear that as the reflecting power R increases, the effective number of interfering beams increases so that the half-intensity width $W_{1/2}$ sharply decreases.

It is easily possible today to provide mirrors for a Fabry-Perot type interferometer having a reflectivity of 97% with multilayer dielectric reflectors in the visible portion of the spectrum and of 99.5% or more in the infrared region. From the above table, these values would result in 96 and 584 effectively interfering beams respectively with an attendant exceptionally high resolution.

To make full use of this high resolution, it is recognized as necessary that the light source used with the instrument have a line width $\Delta\lambda_L$, which is smaller than the instrument width $\Delta\lambda_I$ which from Equation 9 is equal to $$\Delta\lambda_I = \frac{\lambda}{nN_e} \quad (12)$$

Thus, the relative line width of the light source should be $$\frac{\Delta\lambda_L}{\lambda} < \frac{1}{\rho N_e} \quad (14)$$

Where $$\eta = \frac{\rho}{\lambda}$$

where $\rho$ is the path difference between successive interfering beams.

As expressed by Equation 3 above, the fringe displacement for a vertical terrestrial directional reference system at latitude $\phi$ is, $$\Delta\eta = \frac{4\omega S \cos \phi}{C\lambda}$$

which can be increased by a factor $l$ by sending the beams $l$ times around the circuit. Moreover, where the instrumentation permits measurements of a fraction $1/k$ of the instrument width, it is necessary that $$\Delta n \geq \frac{W_{1/2}}{kl} \quad (15)$$

The minimum area of the optical circuit in the directional reference system is, therefore, with Equations 3 and 15

$$s \geq \frac{W_{1/2}}{kl} \times \frac{c\lambda}{4\omega \cos \phi} \quad (16)$$

That the area required according to the above relation 16 becomes practical can be seen from the following values for the parameters of $W_{1/2} = 0.0016$ for $R = 99.5\%$; (see Table I); $k = 100$; $\omega = 7.27 \times 10^{-5}$ radians per second; $\lambda = 5 \times 10^{-5}$ (5000 angstroms) at a latitude $\phi$ of 40°; and $l = 10$. With these parameters, S becomes $1.25 \times 10^4$ cm.². This area could be achieved by a square-shaped circuit 1.1 meters on a side.

Since the above calculations assume a fully monochromatic light source, that is, infinite spectal coherence ($\Delta\lambda_L = 0$) the resolution of the device is instrument-limited. It is, therefore, necessary that the light source have a minimum relative line width $$\frac{\Delta\lambda_L}{\lambda}$$

as determined by Equation 14. For a more sensitive instrumentation, by increasing the value of $k$, when according to Equation 15, a still smaller circuit can be used, its lower interferomatic resolving power $\phi S$, corresponding to a larger relative instrument width, permits the useful light source to have a correspondingly larger relative width $\Delta\lambda_{L/\lambda}$.

In the above example, and for $k = 100$, we obtain with Equation 14 an upper limit for the relative source line width:

$$\frac{\Delta\lambda_L}{\lambda} = 1.9 \times 10^{-10}$$

Had the value of $k$ been taken as 1000, this upper limit would be:

$$\frac{\Delta\lambda_L}{\lambda} = 6 \times 10^{-10}$$

It will be noted that the relative line widths of the best available standard monochromatic light sources in use, for example, as metric standards, cannot meet the above requirements. Thus, the relative line width of the red cadmium line at 6438 angstroms which has been used for many years as the primary length standard, is $1.75 \times 10^{-6}$. For the recently adopted standard krypton 86 line at 6056 angstroms the relative line width is $7.3 \times 10^{-7}$.

The narrowest line available in the usual type of light source is the 4226 angstrom calcium line from an atomic beam light source which still has a relative line width larger than $10^{-7}$. Thus, all of these sources have line widths which are considerably in excess of the instrument resolution and which would, therefore, constitute a limitation on fringe resolution which would not permit the practical realization of the circuit parameters discussed above. They lack the required spectral coherence.

It is, however, possible to achieve such line widths, and to obtain the required spectral coherence from optical maser-type devices (also known as "lasers"). By way of example, a gaseous optical maser of the neon-helium type can give a monochromaticity better than 1 part in $10^{14}$. That is to say, with such an optical maser one can realize $$\frac{\Delta\lambda_L}{\lambda}=10^{-14}$$

Returning to the apparatus proposed by Michelson and shown in FIGURE 1, and assuming that the present inventive concepts are to be applied to such a device by providing interferometric equipment of high resolution in combination with sources of radiation of high spectral coherence, certain problems will prevent the effective utilization of such a device as a directional reference system. Namely, in the Michelson and any similar device, the beam splitter mirror 21 is contained directly within the main optical circuit for both the clockwise and counterclockwise beams. This beam splitting mirror 21 necessarily has a transmission and reflection coefficient of less than 50%. Therefore, even if mirrors 24, 30 and 31 have high reflecting power, this beam splitter will prevent effective multiple beam formation as well as multiple traverses of the circuit.

In accordance with the present invention, and in furthere combination with a radiation source of high spectral coherence and high resolution interferometer, I have isolated the main optical circuit as much as possible from the beam splitting means to retain a maximum of the circulating light flux within the circuit.

A novel circulatory interferometer system constructed in accordance with these principles is set forth in FIGURE 2 where a main optical circuit enclosing the area S is formed of four mirrors 60, 61, 62 and 63. The mirrors 61, 62 and 63 are totally reflecting, while mirror 60 has a high reflecting power R of 95 to 99.5% so that it transmits only a small percentage of the light traversing the main optical circuit.

An auxiliary and smaller optical circuit is formed by mirrors 60, 64, 65 and 66 where mirrors 64 and 66 are totally reflecting, while mirror 65 is the beam splitting device and is approximately 50% reflecting and 50% transmitting.

The light source for the device is formed by an optical maser source 67 which is comprised of an active medium 68 contained within an optical resonance cavity which is formed by two mirrors 69 and 70 at either end to define a Fabry-Perot type interferometer system. The active maser medium 68 is capable of being excited to stimulated optical emission where there is an input energy source to produce a negative temperature population. The active maser material contained within the resonance cavity 69 and 70, where mirror 70 is totally reflecting and mirror 69 is highly reflecting, constitutes a source of a highly coherent light beam which emerges toward beam splitter 65.

Optical masers of this type are well known in the art, and further description thereof is not necessary for purposes of the invention. In particular, the energy source producing the negative temperature distribution of the transition levels may be one of optical, electrical, or electron energy. A typical example of a laser is shown in my copending application Ser. No. 134,521, filed August 28, 1961, entitled "Optical Masers," and assigned to the assignee of the present invention.

Returning now to FIGURE 2, the coherent beam directed at beam splitter 65 is divided there into a clockwise and a counterclockwise beam. Each of these beams enter the main optical circuit including mirrors 60 through 63 and, in consequence of the small losses within the circuit, the beams will traverse the circuit a multiple number of times, and forming a multiplicity of beams, will come to interference at mirror 60, obtaining the advantages of high resolution characteristic of multiple beam interference. A part of this returning light will then be directed, by a lens system 150, to a detection and measuring system 151. Detection system 151 could, for example, be a photo-electric transducer detection system comprising a double photo-electric transducer system in suitable bridge circuitry using a sensitive split field method to determine a small fraction of a fringe shift.

Such systems are well known in the art where one of the mirrors such as mirror 60 or 62 will have over one-half of its surface a step of $\frac{1}{20}$ of a wavelength, for example, which is imaged onto the photoelectric transducer system by lens system 150. A first of the photoelectric cells will see the illumination from one side of the step while the other of the cells will see the illumination from the other side of the step.

FIGURES 3a and 3b indicate the position of one interference fringe for each of the half-fields which are shifted in phase relative to each other, and may be intercepted by the entrance pupils of the photo-electric transducers at portions indicated by coordinate X.

When the fringe positions for the two photocells are at a predetermined value $\lambda_1$, the intensity is equal for each of the cells so that the bridge is balanced. However, when the fringes shift to a new position $\lambda_2$ relative to the cells, it is apparent that the bridge circuit will be unbalanced so that the small fringe shift $\lambda_2-\lambda_1$ can be measured.

Because of the requirement for efficient light circulation in the main optical circuit, it will be noted that only a small percentage of the light from the light source will leave the circuit. However, the optical maser source permits a very high brightness of its stimulated radiation so that only moderately sensitive photoelectric systems measuring the fringe shift are needed, and adequate light is provided for such measurement.

Moreover, the far higher resolution of the multiple beam fringes from the main circuit mirrors 60, 61, 62, 63 permits an easy discrimination from the broad cosine square shaped interference of low resolution from the auxiliary circuit 60, 64, 65, 66.

FIGURE 4 shows how the system of mirrors 60, 64, 65 and 66 can be formed by a plurality of prisms 200, 201, 202, 203, 204 and 205 which are cemented together as shown.

The light beam coming from the optical maser 67 in FIGURE 2 is illustrated as beam 208 which is split at surface 207 to be partially reflected toward surface 209 of prism 202 which serves the purpose of mirror 64, and is thereafter directed toward surface 206 which serves the purpose of mirror 60. The other portion of beam 208 passes directly through layer 207 to impinge upon surface 210 of prism 205 which serves the function of mirror 66 and directs the beam of light upwardly toward surface 206, as illustrated. The net result is that a first beam of light 211 passes through surface 206 to become the counterclockwise beam of light in the main optical circuit, while a second beam 212 passes through surface 206 to become the clockwise beam of light in the main optical circuit.

As the interfering light beams circulate around the main optical circuit of FIGURE 2 some integral number of times, the effect may be compared to the beams of light which travel back and forth between two parallel plates in a Fabry-Perot type of interferometer. In this latter interferometer, the path difference between two consecutive interfering beams is $2t$ which is twice the distance between the end plates, but in the circulatory interferometer of FIGURE 2 the path difference between two consecutive beams is equal to the circumference of the optical circuit.

The calculations presented above in Table I which show the half-intensity width $W_{1/2}$ and effective number of interfering beams as a function of reflectance R were derived for the case of equal reflecting powers of the two mirrors of a standard Fabry-Perot interferometer. In the case of the circulatory interferometer of FIGURE 2, these reflectance values R correspond to the square root of the comprehensive reflecting power of mirrors 60 through 63. The quantitative results presented above and drawn from the values given in Table I are hardly affected by the change in the form of the interferometer.

In the circulatory interferometer of FIGURE 2, the clockwise and counterclockwise beams of light within the optical circuit form two systems of multiple interfering beams with slightly different effective successive path differences when the optical circuit is rotated or, for example, includes a component of the earth's rotation so that the beams will interfere with one another when they return to mirror 60 after an integral number of traverses about the optical circuit with the mutual path differences $\Delta n$, as shown in Equations 1 to 4, and integral multiples thereof.

It will be noted that optical imperfections within the main and auxiliary circuits as due to inhomogeneities of the materials, temperature gradients or vibrations will cancel one another in the oppositely circulating beams and will have no effect on the measurements of the path difference $\Delta n$.

The directional reference system described above in FIGURES 2 and 4 relies heavily for adequate resolution on the sharpening of the interference fringes through multibeam interferometry techniques. In order to take advantage of the high resolution available with these techniques, an optical maser having a line width which is not in excess of the instrument width was necessary so that the small rotational fringe displacements could be measured.

The optical maser in this case, however, is merely used as an external light source, and the considerably smaller line widths with respect to the instrument width obtainable with optical masers as above explained could not be advantageously utilized because of the limited resolution within the instrument itself. I have found that I can take further advantage of the considerably higher spectral coherence available in optical sources than are required for the specific circulatory interferometer of FIGURE 2 to provide improved measurement by making the optical maser an integral part of the optical circuit. Thus, in a system of this type, it is the spectral coherence of the light source itself that would determine the limit of resolution so that measurement of very small angular motions can be made to very high accuracies.

A circulatory multiple beam interferometer system of this type is set forth in FIGURE 5 where the main optical circuit is again defined by mirrors 60, 61, 62 and 63, while an auxiliary circuit is defined by mirrors 60, 64, 65 and 66, as was the case in FIGURE 2. In FIGURE 5, however, the active optical maser medium 67 is interposed directly between mirrors 61 and 62 and directly within the main optical circuit which now forms the optical resonance cavity and determines the frequency of the optical maser oscillation. The active optical maser medium 67, for example, is of the neon-helium gas mixture type and depends upon an external electric source to produce its population inversion or negative temperature. Therefore, the frequency of the optical maser oscillation will be determined in detail by the circuit parameters of the main optical circuit in such a way that for the preferred oscillation mode within the line width of the spontaneous emission, the total circumferential path around the circuit including mirrors 60 through 63 is some integral multiple $n$ of the wavelengths V of the stimulated emission.

Accordingly, if the optical interferometer circuit is placed on a rotating platform, the path changes of the clockwise and counterclockwise beams generated within the optical maser cavity must result in frequency changes so that the characteristic frequency $V_0$ which is produced while the system is in a non-rotating state will be split into two frequencies $V_1$ and $V_2$ (above and below $V_0$ respectively) when the system rotates.

As viewed from an inertial system, the circumferential paths for the clockwise and counterclockwise beams will then be, respectively:

$$p_1 = n\lambda_2 = \frac{nc}{V_1}$$

and $$p_2 = n_2 = \frac{nc}{V_2}$$

Thus, $$V_1 = \frac{nc}{p_1}; \quad V_2 = \frac{nc}{p_2}$$

and $$\Delta V = V_1 - V_2 = nc \frac{\Delta p}{p_2}$$

$$n = \frac{p}{\lambda}$$

since $$\Delta V = \frac{c}{\lambda} \times \frac{\Delta p}{p} \qquad (17)$$

Since $c/\lambda = V$, this means that the relative frequency changes are equal to the relative optical path changes, and the derivation of Equation 17 could also have been started from this premise.

Where this device is used as a vertical terrestrial directional reference system, the path difference $\Delta p$, which corresponds to the previous fringe displacement $\Delta n$ of Equation 4 will be $$\Delta p = \lambda \Delta n = \frac{4\omega S \cos \phi \cos \alpha}{c} \qquad (18)$$

Therefore, from Equations 17 and 18

$$\Delta V = \frac{4\omega \cos \phi \cos \alpha}{\lambda} \times \frac{S}{p} \qquad (19)$$

If the interferometric circuit is a square of side length L, it follows, since $S = L^2$, and $p = 4L$:

$$\Delta V = \frac{\omega L \cos \phi \cos \alpha}{\lambda} \qquad (20)$$

This frequency difference, $\Delta V$, for the optical maser output frequencies for the two circulating light beams would lead to a beating at frequency $\Delta V$ when the beams are combined at a photoelectric detector. The beams from the main optical maser circuit 60, 61, 62, 63 enter at mirror 60 of auxiliary circuit 60, 64, 65, 66 and are directed to a photoelectric detection system 250 in which the beat frequency is produced, resulting in an electric output modulation of that frequency.

Figure 6:
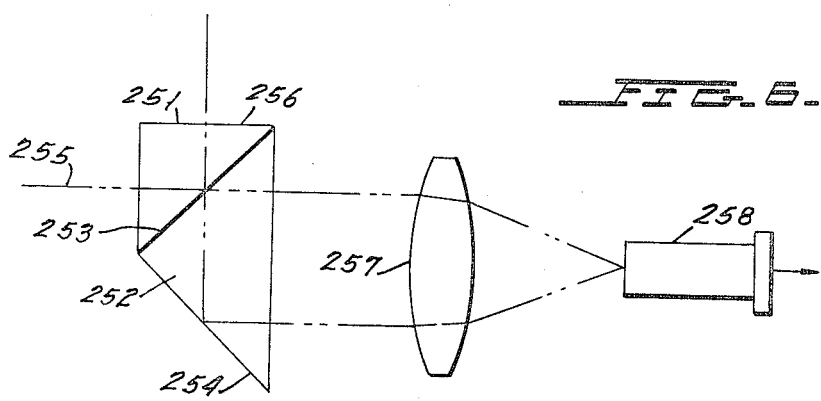
FIGURE 6 illustrates the manner in which the portion of an optical portion of FIGURE 5 can be formed of a plurality of prisms cemented together in forming a rigid unitary body.

Before considering this detection system, however, it will be noted that in the system of FIGURE 5, the reflecting surfaces of the auxiliary circuit comprising mirrors 60, 64, 65 and 66 can be replaced by the provision of two prisms 251 and 252 of FIGURE 6 where prism 251 is provided with a highly reflecting surface 253 for instance of multi-dielectric layers with a resulting reflectance of 99.5%.

The output beam is then directed toward a lens 257 which combines the two beams at photoelectric transducer 258. Since photoelectric transducers act as square law detectors for the amplitudes of the coherent light beams, photoelectric transducer 258 then develops an output at the beat frequency $\Delta V$, which can be connected to appropriate electronic circuitry for amplification and measurement for instance by a frequency meter or pulse counter, to be utilized as a direct indication of the angular velocity of the optical circuit, or for many directional reference, control, guidance and navigation purposes.

Since frequencies can be measured at very high accuracy, actually better than by one part in $10^{11}$, any measurements or system performances derived from frequency measurements, inherently can reflect the same accuracy.

A system as illustrated in FIGURE 5 represents a novel regenerative circulatory multiple beam interferometer, in which the stimulated emission of the active material compensates for losses at the mirrors by absorption and diffraction, resulting in a very large increase in the effective number of interfering beams, and thus of the resolving power. It is equivalent to a regenerative circuit with an extremely high quality factor Q, and the Q is equal to the spectral resolving power S which, from Equations 9 and 13, is identical to $\lambda/\Delta\lambda$. Thus, Q values of over $10^{14}$ can be obtained in these novel interferometer configurations.

The optical arrangements of FIGURES 5 or 6 make it possible to retain within the main optical cavity resonance circuit comprised by mirrors 60, 61, 62, 63, very high reflecting powers and thereby obtain very high values for Q and for the resolving power.

Accordingly, the instrument of FIGURE 5 is limited only by the source rather than by the interferometer itself.

In a typical system where the device of FIGURE 5 is used as a vertical terrestrial circuit at latitude 408 and with the angular earth rotation of $7.27 \times 10^{-5}$ radians per second, and with a wavelength of 11,530 angstroms which is the strongest line of the above mentioned neon-helium optical maser, the beat frequency $\Delta V$ will be, from Equation 19:

$$\Delta V + 1.66 \times \frac{S}{p} \cos \theta \cos \alpha$$

For a square circuit, one obtains from Equation 20

$$\Delta V = 0.42 \times L \cos \phi \cos \alpha.$$

Thus, for a square circuit whose sides are 1 meter (=100 cm.) long, there would be a maximum beat frequency produced at 42 cycles per second. An interferometer circuit of the same size fixed to a platform rotating at 1 revolution per minute would produce a frequency split and beat frequency of about 9,000 cycles per second. These beat frequencies can be measured by any of the various presently available frequency measuring means, for instance by pulse counters, whose output can be utilized directly in digital computers, if desired.

In the two above given numerical examples, the frequency split, or beat frequency, is considerably larger than the optical maser frequency bandwidth, which, for instance, for the neon-helium optical maser can be better than 1 cycle per second.

Even for frequency splits which would be smaller than the bandwidth of the optical maser oscillations, the modified line shape, and thereby the frequency split, can be determined by optical superheterodyne methods, for instance, by mixing the oscillations with the output of a second optical maser arranged outside of the optical cavity resonance circuit.

In FIGURE 8, components similar to those of FIGURE 5 have been given similar identifying numerals. In FIGURE 7, a second optical maser 260, which is comprised of the active optical maser material 261 contained within an optical cavity formed by highly reflecting mirrors 262 and 263, is placed between the output from mirror 65 and the photoelectric transducer means 258. If the frequency of optical maser 260 coincides with that of the main circulatory optical maser system represented by the active medium 67, and the resonance cavity 60, 61, 62, 63 for the non-rotating state (such as a North-South orientation of the plane of a vertically disposed circuit), the introduction of the rotational frequency splitting due to turning the vertical circuit from its North-South orientation will "detune" the main circulatory optical maser and thereby greatly change its interaction with optical maser 260. That is to say, there will be a substantial change in the mutual stimulation or absorption between the masers which would result in a change of the light intensity incident upon transducer 258.

In order to obtain a null calibration or modulation, a small auxiliary circuit can be formed through the provision of auxiliary mirrors 270 and 271 to provide a small calibration circuit including mirrors 61, 62, 270 and 271. The area of this calibration circuit is small so that its frequency split would be small as compared to the frequency split in the main circuit which includes mirrors 61, 62, 63 and 60. Therefore, a direct measure of the angular rotation or of the orientation of the circuit can be provided. This calibration method can also be used with systems of the types illustrated in FIGURES 2 and 5.

In the systems of FIGURES 5 and 7, and since, as indicated above, the frequency change will be proportional to the ratio of $S/p$ or to the ratio between the area and circumference of the circuit, a maximum frequency change will be provided when the circuit is formed of a regular, equally sided polygon. Thus, more easily measured outputs are provided when the circuit is square-shaped, rather than rectangularly shaped. Clearly, however, a rectangularly shaped or other shaped circuit can be used with decreased, but useful, outputs.

In the systems of FIGURES 2, 5 and 7, the output produced, either in terms of a shift in fringe position resulting in a change of intensity, or a frequency split or beat frequency, is determined in a photo-electric transducer-type means. The transducer output may then be utilized to provide either a direct indication of the output to be utilized to provide a directional or rotational reference, or utilized to provide a directional or rotational reference, or for any purposes of control, guidance, and navigation.

By way of example, and as is illustrated in FIGURE 8 where components similar to those of FIGURES 2 through 5 and 7 have similar identifying numerals, the main optical circuit including mirrors 60 through 63 may be carried on a platform which can be positioned by a servo motor 300 which as schematically illustrated, is connected to the main optical interferometer circuit.

A servo loop may then be provided which includes the output of transducer 258, an output amplifier 301, measuring and analyzing circuits 302, and a servo amplifier 303 which controls motor 300. Such a system can, of course, be used for control and guidance applications where, when the optical circuit assumes an alignment other than some predetermined alignment, an error signal is generated to actuate motor 300 to reduce the error signal to zero, and thus return the optical circuit to its predetermined alignment, and at the same time produce a control output.

Clearly, the elements to be used in the servo loop may be of any standard type.

Where the directional reference system is to be used as a terrestrial compass, its application may be best understood by reference to FIGURE 9. In FIGURE 9, the earth's surface is illustrated with the North-South axis perpendicular to the equator line. The optical interferometer circuit having an enclosed area S is rotatably mounted, as illustrated by the pivotal connection 311, on a vertical axis at latitude $\phi$. The plane of surface S forms an angle $90-\alpha$ degrees with the meridian. With a system of the type illustrated in FIGURE 2, the previous Equation 4

$$\Delta n = \frac{4\omega S \cos \phi \cos \alpha}{c\lambda} \quad (4)$$

determines the fringe shift that will result from the earth's rotation, while from the previous Equation 19

$$\Delta V = \frac{4\omega \cos \phi \cos \alpha}{\lambda} \times \frac{S}{p} \quad (19')$$

determines the frequency split or beat frequency when a system of the type illustrated by FIGURES 5 and 7 is used.

With the system 310 mounted rotatably on a horizontal East-West axis, the system may be used as a vertical reference indicator.

Appropriate output values can be obtained with all the above described systems where even rather small dimensions of the order of a few feet for the sides of a square-shaped optical circuit 310 are provided. Where larger dimensions could be tolerated, as in ships or submarines, as contrasted to aircraft or space vehicles, the requirements for accuracy of the instrumentation can be relaxed in proportion to the permissible increase in the dimensions.

In a space vehicle, a combination of three interferometric circuits of the types described above having their normals oriented perpendicular to one another can be used as a general three-dimensional space reference system.

The attitude of the vehicle can be obtained at any moment by time-integrating and resolving the phase or frequency shift outputs of the individual systems in a suitable computer. The computer outputs can then be compared on a current basis with the directional information obtained, for example, from a celestial reference system for determining accuracy, and upgrading the navigational data.

In this way, the systems described above can form the essential directional reference source for inertial guidance systems in a great variety of terrestrial, marine, submarine, airborne, and space vehicles.

Moreover, output signals so obtained can also be used for platform stabilization, guidance or control purposes.

As another typical application of the system, it can be applied to the monitoring of satellite rotations.

The interferometric systems shown in the illustrative examples of the invention have been of the type using spaced mirrors or reflectors. However, other types of interferometric devices could be applied within the teachings of the invention. By way of example, diffraction gratings can be used since a diffraction grating may be regarded as a multiple beam interferometer which can have values of $N_e$ in excess of $10^5$.

It is also within the scope of this invention to consider other radiations of a kind different from light. From the previous fundamental Equations 1 to 4 and 19 and 20, for instance, it is seen that the wave length $\lambda$ appears in the denominator. Therefore, one would expect that the amount of fringe displacement, or frequency split, and the beat frequency, would be in inverse proportion to the wave length of the radiation, i.e., that these parameters would increase with decreasing wave lengths, and thus that the use of radiations of shorter wave length such as gamma rays or X-rays, or matter waves, would be favorable in increasing sensitivity.

Standard X- and gamma ray lines, however, have such small coherence lengths, e.g., of the order of a micron for K-lines of a few angstrom units, that the construction of interferometers of the type required for the systems of this invention appears practically impossible.

Similarly as the advent of optical masers established practical feasibility of these systems for the optical region of the spectrum, the discovery of recoil-free gamma ray radiation by Mössbauer should overcome the difficulties in the X- or gamma ray region caused by insufficient coherence, because this discovery for the first time made available in this region monochromaticity values of a similar order of magnitude as those obtainable from optical maser sources, and far superior to those previously available with standard X- and gamma ray sources.

Therefore, radiations from Mössbauer sources in the short wave length gamma or X-ray region comprising wave lengths of the order of $\frac{1}{10}$ to a few angstrom units could be utilized in the systems of this invention. In this case, it would be advisable to use as the essential reflecting components of the interferometer circuits crystal reflectors with grazing incidence techniques as known from X- and gamma ray technology, and X- and gamma ray sensitive transducers, e.g., of the photoconductive semiconductor type such as selenium.

Although the present invention has been described and illustrated with exemplary embodiments and preferred modes of operation, it is understood not to be so limited since changes and modifications may be made therein which are within the full intended scope of the invention as defined by the appended claims.

The embodiments of the invention in which an exclusive privilege or property is claimed are defined as follows:

1. A navigational reference system comprising the combination of a laser source of radiation and a high resolution interferometer; said high resolution interferometer including a first optical circuit for circulating radiation with multiple passes around a first closed path and comprising first and second reflecting mirrors, and a first partially reflecting mirror; said first optical circuit defining the optical cavity of said laser source; said laser source positioned between said first and second reflecting mirrors; and a second optical circuit for calibration and for circulating radiation with multiple passes around a second closed path; said laser source emitting radiation in opposite directions to provide counter-rotating beams in said first and second optical circuits; the area enclosed by said second closed path being small with respect to the area enclosed by said first path; said second optical circuit including said first and second reflecting mirrors and second and third partially reflecting mirrors located in said first optical circuit; detector means positioned externally of said first closed circuit and optical means interposed between said partially reflecting mirror and said detector for combining counter-rotating beams of radiation in said first optical circuit into a single path and toward said detector; said first optical circuit for measurement purposes; said second optical circuit for reference purposes.

2. The system as set forth in claim 1 which includes a second laser source means positioned between said detector means and said optical means, and introducing counter-rotating beams of radiation into said first closed optical circuit.

References Cited

UNITED STATES PATENTS 3,102,953   9/1963   Wallace _____ 88—14 X

FOREIGN PATENTS 149,892   11/1961   Russia.

OTHER REFERENCES

Macek et al.: "Rotation Rate Sensing with Traveling-Wave Ring Lasers," Applied Physics Letters, vol. 2, No. 3, Feb. 1, 1963, pp. 67, 68.

JEWELL H. PEDERSEN, *Primary Examiner.*

JOHN K. CORBIN, *Examiner.*